(12) United States Patent
Armellin

(10) Patent No.: US 6,244,315 B1
(45) Date of Patent: Jun. 12, 2001

(54) TYRE WITH HIGH TRANSVERSE CURVATURE COEFFICIENT IN PARTICULAR FOR A TWO-WHEELED VEHICLE

(75) Inventor: Giancarlo Armellin, Nova Milanese (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/291,974

(22) Filed: Apr. 15, 1999

Related U.S. Application Data
(60) Provisional application No. 60/094,009, filed on Jul. 24, 1998.

(30) Foreign Application Priority Data

Apr. 16, 1998 (EP) .................................................. 98830231

(51) Int. Cl.[7] .............................. B60C 11/00; B60C 3/00; B60C 9/04; B60C 9/08; B60C 9/18
(52) U.S. Cl. ..................... 152/209.11; 152/454; 152/458; 152/526; 152/531; 152/532; 152/533; 152/548; 152/556
(58) Field of Search .................................... 152/556, 531, 152/533, 454, 548, 526, 532, 458, 209.11

(56) References Cited

U.S. PATENT DOCUMENTS
5,562,792  10/1996  Caretta .

FOREIGN PATENT DOCUMENTS
| | | |
|---|---|---|
| 0 718 122 | 6/1996 | (EP) . |
| 0 756 949 | 2/1997 | (EP) . |
| 0 808 730 | 11/1997 | (EP) . |
| 0 860 302 | 8/1998 | (EP) . |
| 2 536 017 | 5/1984 | (FR) . |

OTHER PUBLICATIONS
H. Toru, "Pneumatic Radical Tire", Patent Abstracts of Japan, vol. 17, No. 524, of JP 05 139111, (1993) (Yokohama Rubber Co Ltd).

*Primary Examiner*—Adrienne C. Johnstone
(74) *Attorney, Agent, or Firm*—Finnegan, Henderson, Farabow, Garrett & Dunner, L.L.P.

(57) ABSTRACT

A tire for two-wheeled vehicles is described, said tire having a transverse curvature coefficient with a value of not less than 0.15, comprising a torus-shaped carcass having structural means which allow improvements in the handling of the vehicle, while leaving unchanged the other performance characteristics, in particular the comfort. These structural means consist in at least one ply of a rubberized fabric provided with textile cords having a count of between 420/2 and 840/2 dtex and a modulus of elasticity of between 100,000 MPa/cm and 200,000 MPa/cm. Preferably the carcass comprises a pair of these rubberized fabric plies reinforced with PEN cords.

18 Claims, 3 Drawing Sheets

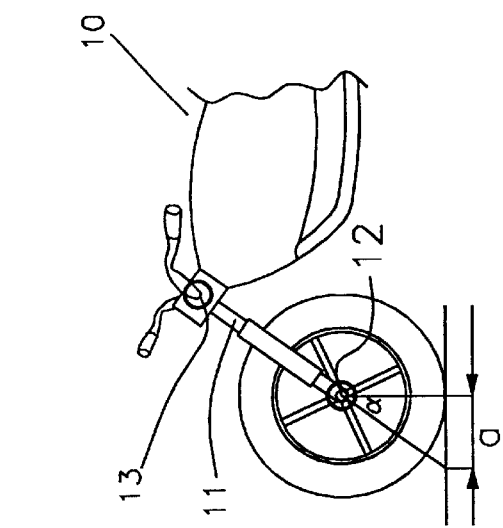
FIG. 6
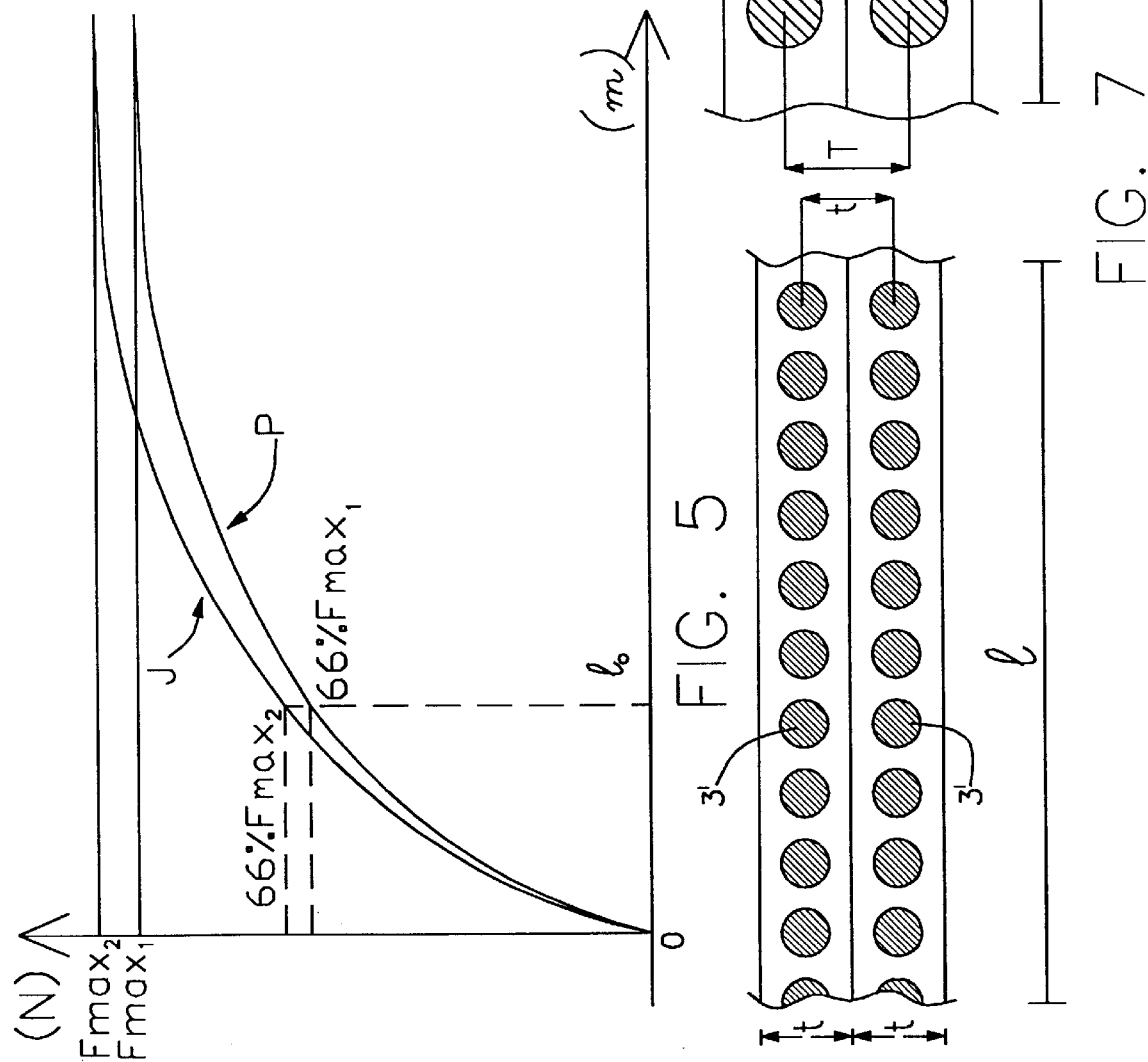
FIG. 7
FIG. 5

TYRE WITH HIGH TRANSVERSE CURVATURE COEFFICIENT IN PARTICULAR FOR A TWO-WHEELED VEHICLE

This application claims benefit of U.S. Provisional Application No. 60/094,009, filed Jul. 24, 1998.

BACKGROUND OF THE INVENTION

The present invention relates to a tire with a high transverse curvature coefficient, in particular suitable for fitting to motorcycles.

The invention relates in particular to tires for two-wheeled vehicles, in which the transverse curvature coefficient, which in any case has a value of not less than 0.15, is greater in the front tire than that of the corresponding rear tire.

Even more particularly the invention relates to tires which have a carcass with a radial structure and preferably have a cross-sectional ratio (H/C)<80% and/or are mounted on a mounting rim with a width>60% than the nominal chord of the tire.

Generally tires for motorcycles comprise a torus-shaped carcass with a central peripheral crown and two sidewalls terminating in a pair of beads for securing the tire to a corresponding mounting rim, a tread extending coaxially around the peripheral crown and a belt structure arranged between the carcass and the tread.

The carcass in turn comprises at least one rubberized fabric ply provided with reinforcing cords which moreover are of the textile type.

The textile cords are identified by a numerical abbreviation which represents the count of the fibre used and the number of strands which combine to form the cord. "Strand" is understood as being a bundle of filaments or single filaments which are twisted together; "count" is understood as being the weight in grammes of a length of 10,000 meters of fibre, expressed in dtex units.

As is known, a two-wheeled vehicle, when travelling along a curved trajectory, inclines on the sidewall inside the bend at an angle, called the camber angle, the value of which can reach a value as high as 65° with respect to the plane perpendicular to the ground; this inclination produces on the part of the tires a (camber) thrust which opposes the centrifugal force acting on the vehicle.

It is also known that, with an increase in speed and a decrease in the radius of curvature of the trajectory, the inclination of the vehicle alone is no longer sufficient to compensate for the effect of the centrifugal force, ensuring the stability of travel of the vehicle itself: an increase in the thrust exerted by the tires is required, and this increase is obtained by varying the position of the vehicle with a manoeuvre, performed by the rider via the handlebars, usually known to experts as "push steering", i.e. inclining the rolling plane of the front tire with respect to the direction tangential to the curved trajectory at an angle, called "slip angle", directed in the opposite direction to the curvature of the trajectory.

This therefore produces a total thrust which is the sum of a camber thrust resulting from the inclination of the equatorial plane of the tire with respect to the vertical and a slip thrust caused by the angular variation in the rolling plane of the front wheel.

The value to be assigned to the slip angle depends on the structural and performance characteristics of the front tire, i.e. on the relationship which the tire is able to express between the value of the slip angle and that of the slip thrust, in combination with its camber thrust and that exerted by the rear tire.

In particular, in order to control steering of a motorcycle in the aforementioned conditions, it is preferred to modify the structural characteristics of the tires represented by the structure and the associated belt reinforcing elements.

A known tire for motorcycles comprises a carcass structure formed by a pair of rubberized fabric plies reinforced with cords which are symmetrically inclined with respect to the equatorial plane of the tire, usually known as a cross-ply carcass, and if necessary a belt structure which is also formed with pairs of rubberized fabric strips, with cords which are arranged angled both with respect to the equatorial plane of the tire and the circumferential direction thereof.

The abovementioned tire structure is able to generate considerable camber thrusts, but gives rise to problems relating to comfort, stability and road-holding power of the vehicle as well as fatigue on the part of the rider, caused by the excessive rigidity of these tires.

These drawbacks have been partly overcome by a tire which has appeared on the market more recently, comprising a radial carcass combined with a belt structure consisting of textile or metal cords: in particular the tire for use on the rear wheel is provided with a belt structure comprising, and sometimes in an exclusive manner, a wound arrangement of cords which are preferably metallic and oriented in the circumferential direction, while the tire for use on the front wheel retains the belt structure with radially superimposed strips of inclined cords, indicated above.

This pair of tires has undoubtedly improved the situation from the point of view of riding comfort and stability, particularly during travel on straight roads.

The improvement in the behaviour along straight roads has, however, given rise to a new problem, consisting in the fact that the radial carcass of the tire, in combination with a belt of cords arranged circumferentially (at 0°), during travel around bends is not always able to produce a camber thrust which is suited to requirements, also taking into account the increasingly higher performances of vehicles.

More precisely, the rear tire provides a thrust which is quantitatively less than and qualitatively different from—i.e. is of a linear rather than a curvilinear nature—that of the front tire and this fact makes steering of the vehicle around bends even more critical.

Other tires for motorcycles, together with their structural characteristics, are for example described in the European Patent Applications EP 756,949 and EP 808,730 in the name of the Applicants, to which reference should be made for further more precise details.

Patent Application EP 756,949 describes a tire, in particular for use on the front wheels, which comprises a radial twin-ply carcass containing nylon cords with a count of 940/2 dtex and two radially superimposed belt strips provided with nylon cords with a count of 940/2 dtex arranged symmetrically intersecting with one another in the two strips and with respect to the equatorial plane of the tire. The belt structure further comprises one radially external layer of steel cords, with the constructional characteristics 3×4×0.20 HE HT, where the cords are distributed with a density which continuously increases from the centre towards the ends of the belt.

Basically, according to the technical solution described in this patent application, it is possible to obtain a belt which at the same time is flexible in the centre, in order to absorb and dampen the vibrations due to the roughness of the ground, and rigid laterally, so as to generate notable slip thrusts, by providing a central portion which is mainly provided with cords at zero degrees, in combination with a low density or total absence of reinforcing elements oriented in the transverse direction, and two side portions provided both with cords at zero degrees and with reinforcements oriented in an intersecting direction with respect to the equatorial plane.

These tires, compared to tires which have a radial twin-ply carcass made of nylon 940/2 dtex and a single pair of belt strips with cords intersecting with one another in the two strips, have provided better results with regard to the capacity for absorption of the roughness of the road surface (contact feeling), the behaviour of the vehicle (ease of handling) and the stopping distance (braking capacity).

Patent Application EP 808,730 describes a pair of tires for a motorcycle, i.e. a front tire and a rear tire.

More specifically, the front tire comprises a radial twin-ply carcass with textile cords made of a material having a higher count than that of the tire according to the preceding application, i.e. rayon 1220/2 dtex instead of nylon 940/2 dtex.

The belt consists of a radially external layer of metal cords, which are oriented circumferentially and have an axial variable density, and a radially internal layer consisting of a mixture reinforced with aramide paste, oriented in the circumferential direction.

In turn, the rear tire comprises a radial twinply carcass comprising cords made of nylon with a count of 1400/2 dtex and a belt layer with metal cords oriented circumferentially and distributed with a constant density.

These pairs of tires were compared with pairs of traditional tires where the front tires had a nylon radial twin-ply carcass and a belt structure consisting of a pair of rubberized fabric strips with aramide cords which are symmetrically inclined with respect to one another in the two strips, while the rear tires had a nylon twin-ply carcass and belt with circumferential cords made of aramide.

The outcome of the comparison between the pair of tires according to this latter patent application and those according to the prior state of the art also highlighted improvements, in particular as regards the capacity for absorption of the roughness of the road surface, the road-holding power and the stopping distance.

In particular, according to this solution, during travel around bends, the front tire has a performance which is qualitatively identical to that of the rear tire, i.e. is of the linear type: as a result, the vehicle acquires a neutral behaviour in terms of steering, which solves the problem arising with the pairs of tires according to the known art, essentially consisting in over-steering of the vehicle, due to the inability of the rear tire to oppose the centrifugal force in the presence of a front tire which is able to develop a camber thrust sufficient to counterbalance the centrifugal force, with a consequent tendency of the motor vehicle to skid towards the outside of the bend.

Therefore the current state of the art indicates the direction for research into further improvements in the use of belts comprising at least one layer of metal cords arranged at a substantially zero angle with respect to the equatorial plane and distributed with an axially variable density, in combination with carcasses made of rubberized fabric comprising textile reinforcing cords with a count which is increasingly higher than that of nylon fabric having cords with a count of 940/2 dtex, and hence fabrics which are stronger, even though of increasing weight.

All of this having been stated, the current demands of motorcycle manufacturers are pushing research towards further improvements in tires, in order to achieve a greater travelling stability of the vehicle, better grip of the tire on the ground and in particular better handling of the vehicle, obviously without adversely affecting all the other performance characteristics during riding.

In particular, there is a growing demand for easier handling in order to improve the performance of the vehicle on mixed travel surfaces, consisting of bends in either direction alternating with straight sections, and in particular for tires which are intended for competitive use, in a desperate attempt to reduce track lapping times in tests and competitions.

This demand may be satisfied by reducing the deformability of the tire carcass and increasing its rigidity, so as to allow more rapid transmission of the forces between the hub of the wheel and the ground, through the carcass, but this results in a reduction in comfort along straight sections, which, as mentioned, must be avoided.

Following the teachings of the state of the art, the Applicants have thought to use the carcasses formed by fabrics with high-count cords which had produced the best results, attempting to safeguard and possibly further increase the quality of the performance of the tire with further modifications of other structural parts.

In order to improve the handling, it was initially thought to continue using the carcasses with high-count rayon cords, using a greater height for the backfolds in the sidewalls and a filling with a rubber mixture having a greater hardness than that traditionally used; however, the greater rigidity conferred on the carcass, although producing a certain improvement with regard to the handling, gave rise to vibrations (or "shimmy") during travel with a consequent loss of stability of the vehicle, loss of comfort and shorter life of the tire owing to irregular wear of the tread.

Research, while keeping the rayon carcass unchanged, then concentrated on finding a mixture for the tread which would have a high modulus of elasticity so as to contribute to a greater rigidity of the tire at the same time as better grip on the ground. These attempts also did not produce satisfactory results.

During the carrying-out of the various comparative tests it was found that a tire made at random using a carcass fabric available in the warehouse, containing textile cords with a count of 550/2 dtex, produced a significant improvement in performance in terms of the time for completing one lap of the track, compared to a tire which hitherto was considered to offer the best performance and which had a carcass fabric provided with higher-count rayon cords, while maintaining the same levels of comfort and response.

The result obtained was entirely unexpected in that it was contrary to what the improvements of the state of the art had taught and what was logically predictable.

The subsequent analysis, in view of the positive nature of the result, involved detailed identification of the structural parts of the fabric and their characteristics.

The fabric achieving this improvement was identified as being a type already described in the pending patent application 97EP-830499.6 in the name of the same Applicants relating to motor vehicle tires provided with a carcass having low-count cords, specifically made of PEN.

The fabric was aimed at reducing the weight of motor vehicle tires.

The fact that this fabric with low-count cords had not been identified initially as a possible improving factor in a motor-cycle tire can be explained by the different behaviour, around bends, of the two types of tire (for cars and for motorcycles, respectively), the aforementioned fabric not having demonstrated any particularly interesting characteristics in car tires, apart from its said lightness.

In fact, a motor vehicle tire around bends remains substantially in contact with the ground along its entire axial extension and its performance characteristics depend mainly on the characteristics of the belt structure, as demonstrated by the "bean-shaped" deformation of the impression area of the tire, which is entirely absent in the case of motorcycle tires.

In a different manner, the motorcycle follows a curvilinear trajectory, inclining the equatorial plane of the tires at angle values which are fairly high with respect to the vertical line to the ground: the impression area of the tire is not deformed in a "bean-like" manner, but is displaced axially from the equatorial plane towards the end of the tread and vice versa when entering a bend and leaving a bend.

This displacement of the impression area in combination with the inclination of the rolling plane of the tire requires an accentuated curvature of the tread in order to prevent, when travelling around a bend, the sidewall of the tire from coming into contact with the road.

For this reason a motorcycle tire has a transverse curvature which is much greater than that of a motor vehicle tire; in the case of the former the transverse curvature coefficient is usually greater than 0.15, whereas in the second case it is less than 0.05.

It is known moreover that, in order to obtain good stability and good manoeuvrability of the vehicle, the front tire must have a smaller cross-sectional width, and hence a greater transverse curvature of the tread, preferably greater than the transverse curvature of the corresponding rear tire and, even more preferably, not less than 0.30.

The different disposition of the two types of vehicles has a considerably different effect on the behaviour of the respective tires and their structure, in particular along curvilinear trajectories, and results in deformations of the carcass which are not comparable with one another.

The marked behavioural difference between motor vehicle tires and motorcycle tires may be better understood by considering that, in brief, the former operate with a slip angle of about 30° and a camber angle of 2° or 3°, and the latter with a slip angle of 2° or 3° and a camber angle on average of 45°, with values increasing up to 65° and more.

Therefore it was not foreseeable that a carcass fabric with low-count cords could produce improvements in motorcycle tires.

By way of conclusion, the improvements which have emerged from the comparative tests are due to the entirely random use of a fabric with low-count cords, available in the warehouse for tests on motor vehicle tires, and not a systematic selection of fabrics expressly intended to identify the best fabric for solving the problem.

BRIEF SUMMARY OF THE INVENTION

According to a first aspect thereof, therefore, the invention relates to a tire for two-wheeled vehicles, having a transverse curvature coefficient with a value of not less than 0.15, comprising a torus-shaped carcass with a central peripheral crown and two sidewalls terminating in a pair of beads for securing said tire to a corresponding mounting rim, a tread extending coaxially around said peripheral crown and a belt structure arranged between said carcass and said tread, said carcass comprising at least one rubberized fabric ply provided with reinforcing cords, characterized in that said reinforcing cords are textile cords with a count of between 420/2 and 840/2 dtex and the fabric incorporating said cords has a modulus of elasticity of between 100,000 MPa/cm and 200,000 Mpa/cm.

Preferably the rubberized fabric ply of the carcass comprises textile cords made of PEN.

Preferably the density of the textile cords in the carcass fabric is between 125 cords/dm and 280 cords/dm.

Advantageously the count of the textile cords incorporated in the carcass fabric is 550/2 dtex.

Even more preferably, the carcass of the tire comprises a pair of rubberized fabric plies with cords arranged parallel with one another in each ply and intersecting with those of the adjacent ply; the cords have a direction which is inclined relative to the equatorial plane of the tire and the angle of inclination of the cords with respect to the equatorial plane of the tire, measured on the peripheral crown at said plane, is between 70° and 90°.

According to a second aspect thereof, the invention relates to a motorcycle tire wheel comprising a tire having a transverse curvature coefficient with a value of not less than 0.15 and a rim which can be associated with a hub of the motorcycle.

The tire comprises a torus-shaped carcass with a central peripheral crown and two sidewalls terminating in a pair of beads for securing said tire to the mounting rim, a tread extending coaxially around said peripheral crown and a belt structure arranged between said carcass and said tread.

The carcass comprises a reinforcing structure formed by a pair of rubberized fabric plies provided with reinforcing cords which, in accordance with the invention, define structural means able to ensure at the same time rigidity and flexibility performance characteristics.

These structural means consist of textile cords with a count of between 420/2 and 840/2 dtex and rubberized fabric incorporating said cords, having a modulus of elasticity of between 100,000 MPa/cm and 200,000 MPa/cm.

According to a third aspect thereof, the invention relates to a motorcycle fitted with a pair of tires, respectively a front tire and a rear tire, having a transverse curvature coefficient with a value of not less than 0.15, where at least the carcass of the front tire comprises a rubberized fabric which has a modulus of elasticity of between 100,000 MPa/cm and 200,000 MPa/cm and which incorporates textile cords with a count of between 420/2 and 840/2 dtex.

According to a further aspect thereof, the invention relates to a method for controlling the handling of a motorcycle by means of the carcass structure of the tires fitted to it, characterized by providing at least one of said tires with a carcass structure comprising at least a rubberized fabric provided with a plurality of textile reinforcing cords with a count of between 420/2 and 840/2 dtex and having a modulus of elasticity of between 100,000 MPa/cm and 200,000 MPa/cm.

The method of the invention consists advantageously in manufacturing a carcass structure capable of controlling the handling of the motorcycle along so-called slalom-type travel paths consisting of a plurality of successive alternating bends.

It has been discovered, in fact, that it is possible to provide the carcass structure at the same time both with rigidity and with flexibility characteristics which mainly perform their function in different situations, only when necessary: in particular, rigidity around bends and flexibility along straight sections, so that that the rigidity results in slip thrusts which are sufficient to counter-balance the centrifugal forces together with the camber thrusts, and the flexibility results in absorption of the roughness of the road along the straight sections.

The method consists in forming the carcass structure with fabrics which are thinner than those used hitherto and which are reinforced with textile cords with a count of between 420/2 dtex and 820/2 dtex, controlling the rigidity of the fabric by means of the density of the reinforcing elements.

Preferably, according to the method of the invention, in order to control better the handling of the motorcycle, the carcass structure is obtained by combining two reinforcing fabrics, each with the aforementioned characteristics.

DESCRIPTION OF THE DRAWINGS

The present invention, however, will be better understood with the aid of the description which follows and the accompanying figures, which are intended solely by way of a non-limiting illustration, in which:

FIG. 5 shows a qualitative diagram of the slip thrust pattern for a tire according to the invention and for a tire of the known type;

FIG. 6 shows a partial side view of the front part of a motorcycle provided with a wheel according to the invention;

FIG. 7 shows, on the same scale and in crosssection, the structure of a twin-ply carcass according to the invention, on the left, compared with that of the known art, on the right.

DETAILED DESCRIPTION OF THE INVENTION

Figure 1:
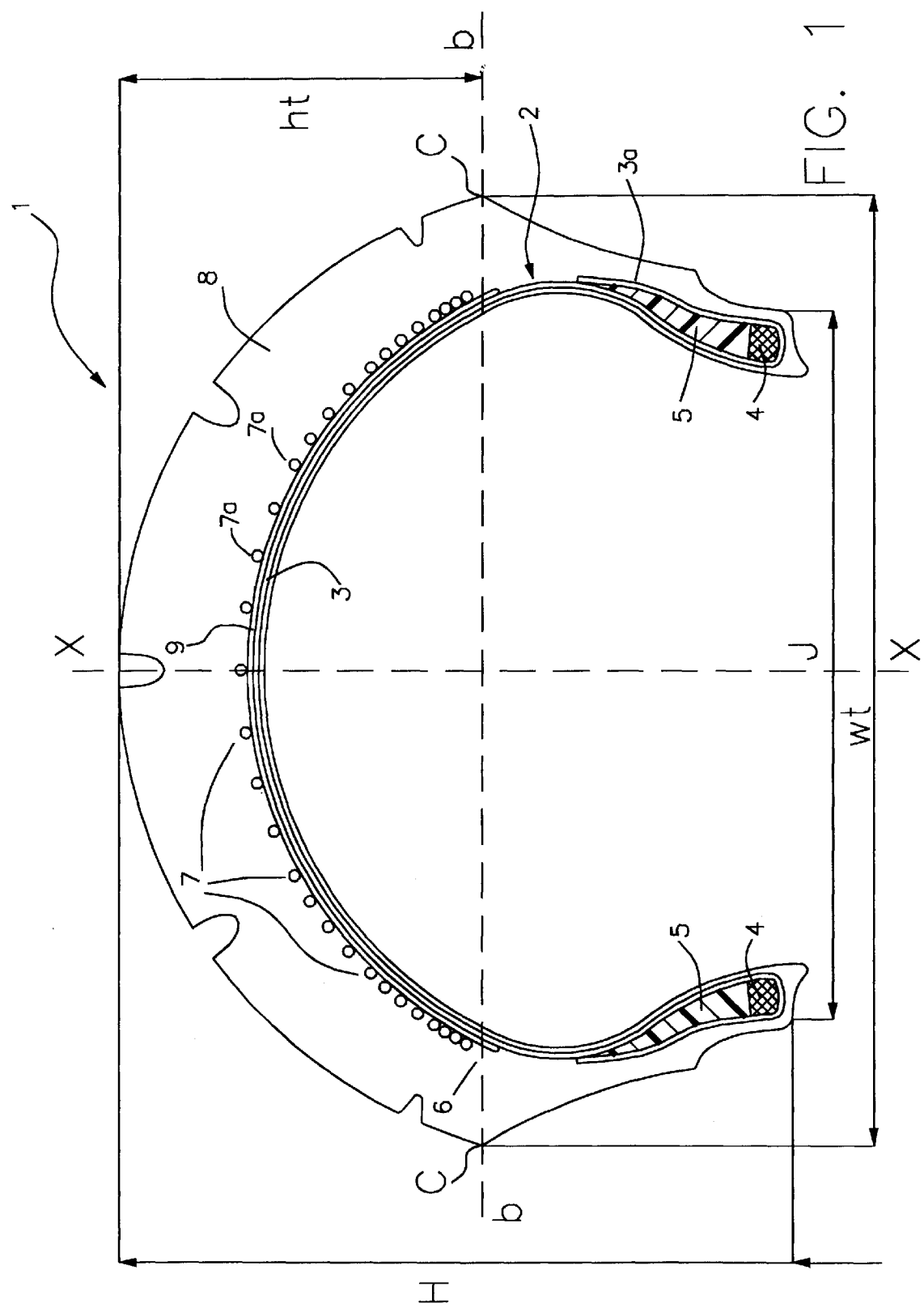
FIG. 1 shows a cross-section through the profile of a tire for vehicle, wheels according to the invention.

With reference to FIG. 1, 1 denotes in its entirety a tire with a high transverse curvature coefficient, in particular for use on the front wheels of motorcycles, according to the present invention.

This transverse curvature coefficient is defined by the particular value of the ratio between the distance ht of the top of the tread from the line b—b passing through the ends C of the tread, measured on the equatorial plane X—X, and the distance wt between said ends of the tread; the transverse curvature coefficient in tires for two-wheeled vehicles has a very high value, normally not less than 0.15.

Preferably the transverse curvature coefficient of the front tire is greater than that of the corresponding rear tire and is preferably greater than 0.30.

Even more particularly, the tires of the invention may have a cross-sectional ratio $(H/wt) \leq 80\%$ and/or may be mounted on a mounting rim with a width $J \geq 60\%$ of the nominal chord of the tire, equal to wt for the tire shown.

The tire 1 comprises a carcass 2 which is toroidally shaped and the structure of which comprises at least one carcass ply 3 consisting of rubberized fabric forming a fundamental part of the invention, as described further below.

The opposite side edges 3a of the carcass ply are folded back around corresponding bead cores 4. An elastomeric filling substance 5 is applied onto the external perimetral edge of the bead wires 4 and occupies the space defined between the carcass ply 3 and the corresponding folded-back side edge 3a of the carcass ply.

The tire zone comprising the bead core 4 and the filling substance 5 form the bead which is intended to secure the tire onto a corresponding mounting rim, not shown.

The aforementioned carcass has, associated with it, a belt structure 6 comprising a radially external layer essentially consisting of one or more cords 7 which are arranged parallel with one another and consecutively next to each other, from one end to the other, on the peripheral crown portion of the carcass, so as to form a plurality of circumferential turns 7a substantially arranged in the circumferential rolling direction of the tire, with an orientation usually said to be "at zero degrees" with reference to its position relative to the equatorial plane X—X of the tire. This external layer preferably consists of a single cord or of a thin strip of rubberized fabric comprising up to five adjacent cords, spirally wound from one end to the other on said peripheral crown portion of the carcass.

Preferably this cord is the well-known metal cord of the high-elongation (HE) type, the use of which and the characteristics of which have already been described in detail, for example, in the European Patent EP 0,461,646 in the name of the Applicants themselves, to which reference should be made for further details. Generally the cord consists of steel wires with a diameter equal to or greater than 0.10 mm, preferably of between 0.12 and 0.35 mm.

Preferably these cords are made from steel wires with a high carbon content (HT), i.e. containing a quantity of carbon equal to or greater than 0.9%. In particular, in a specific prototype prepared by the Applicants, the helical winding of the layer 7 consists of a single cord 7, known as 3×4×0.20 HE HT, spirally wound from one end to another of the belt. These cords have an ultimate elongation usually of between 4% and 8%.

Even more preferably, the density of distribution of the turns of the cord 7, particularly in the tire for use on the front wheel, varies progressively, from the equatorial plane towards the ends, preferably in accordance with a predetermined relationship described in the patent application EP 0,756,949 in the name of the Applicants, to which reference should be made for further details. It is stated briefly here that the density of the cords at 0° in the zone located astride the equatorial plane, where there is the greatest dispersion, is preferably not greater than 8 and more preferably between 3 and 6 cords/cm.

The width of said zone is preferably between 10% and 30% of the axial extension of the belt.

Preferably the quantity of cords in said central zone has a value of between 60% and 80% of the quantity of cords in the vicinity of the shoulders of the tire, where the density of said cords is preferably not greater than 10 and more preferably between 6 and 8 cords/cm.

Figure 4:
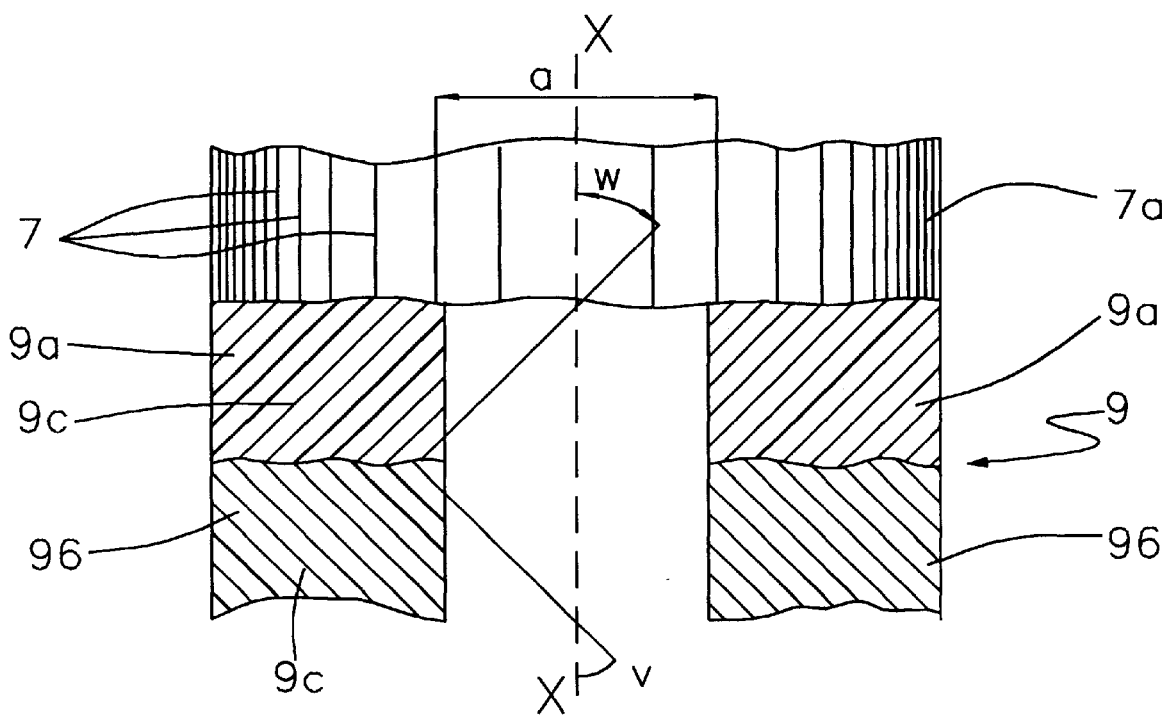
FIG. 4 shows a schematic and simplified plan view of a belt structure associated with the carcass according to the invention, in the absence of said carcass, in an advantageous embodiment.

Preferably, the belt structure also comprises a radially internal reinforcing layer 9 (FIG. 4) which can be made in different mutually alternative forms.

The layer 9 may comprise two radially superimposed strips 9a and 9b of rubberized fabric consisting of reinforcing elements 9c incorporated in an elastomer matrix; these elements, which are parallel with one another in each strip, are oriented in two directions intersecting one another in the two strips and preferably symmetrically inclined with respect to the equatorial plane X—X. The reinforcing elements are preferably cords, which may consist of textile or also metal, and the angles v and w formed by said cords with respect to the equatorial plane, if necessary, different from one another, are between 18° and 50° and preferably between 22° and 45°. The two strips may be interrupted in the region of the equatorial plane, resulting in a zone of width "a" which is preferably between 10% and 30% of the axial extension of said belt and in which only the circumferentially directed reinforcing cords 7 are present.

The variant which is now described has the advantage that there is the possibility of choosing, in the aforementioned strips, density values suitable for the lateral portions of the belt structure, without correspondingly increasing the density in the central peripheral crown portion of the belt structure.

In particular, with nylon cords having a count of 940/2 dtex, density values of between 4 and 8 cords/cm have proved to be advantageous, in combination with angles of orientation relative to the circumferential direction of between 30° and 50°.

According to an alternative embodiment, (FIG. 1), the radially internal layer 9, on the other hand, consists essentially of a sheet of elastomer material arranged between the layer of cords 7 and the carcass ply 3 and comprising a homogeneously dispersed reinforcing filler suitable for increasing the mechanical strength and stretching characteristics of the elastomer material, particularly in the unprocessed state.

The sheet 9 may also be axially continuous or interrupted in the region of the surface X—X, as for the pair of strips already described, and may be used in combination with or as an alternative to said pair of strips.

In particular, the aforementioned sheet of elastomer material 9 consists of a mixture (preferably a mixture based on natural rubber containing quantities of carbon black of between 30 and 70 phr) to which a suitable fibrous filler has been added. In this connection, so-called aramide paste (short fibrillated fibres of poly-para-phenylene terephthalamide), of the type known commercially as "Kevlar pulp" or "Twaron pulp" (Kevlar and Twaron are registered trademarks of Du Pont and Akzo, respectively), is preferred.

The elastomer material reinforced with said aramide paste has, in the unprocessed state, a tensile breaking load of between 3 and 7 MPa with an elongation of 50% at a tensile load of between 0.6 and 3 MPa. The aramide paste is introduced into the unprocessed mixture in quantities of between 1 and 10 phr (parts by weight per 100 hundred parts of rubber) using fibres with a length of between 0.1 and 2.5 mm.

In this case the layer 9 has a thickness which does not exceed 1 mm and is preferably between 0.075 and 0.8 mm, or even more preferably between 0.15 and 0.5 mm, and is advantageously of the order of 0.25 mm.

The carcass 2 comprises at least one carcass ply 3 formed from a rubberized fabric consisting of a sheet of elastomer material incorporating reinforcing cords 3' (FIG. 2): in accordance with the invention, these cords are preferably textile cords made from materials such as aramide, polyethylene terephthalate, commercially known as PET, polyvinyl alcohol, commercially known as PVA and, even more preferably, polyethylene naphthalene-2,6-dicarboxylate, commercially known as PEN.

These cords have a count preferably of between 420/2 dtex and 840/2 dtex and are distributed in the fabric with a density of between 125 cords/dm and 280 cords/dm.

Even more preferably, the modulus of elasticity of the fabric, which is calculated by multiplying the value of the modulus of the individual cord (measured between 20 N and 45 N) by the density of the cords, is 100,000 MPa/cm and 200,000 MPa/cm, while the breaking load of the fabric varies preferably between 900 N/cm and 2000 N/cm.

Figure 2:
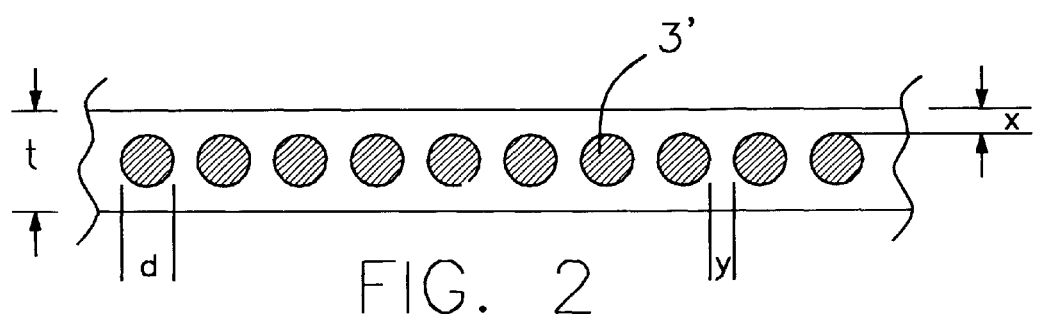
FIG. 2 shows a sectional view along the equatorial plane of the tire according to FIG. 1, in the peripheral crown zone, of the structure of a carcass ply.

FIG. 2 illustrates the corresponding geometrical dimensions of the fabric, viewed in partial cross-section, i.e. the parameters "d" (diameter of the cord), "t" (total thickness of the fabric), "x" (thickness of the rubber sheet which lines the layer of said cords on both the surfaces) and "y", i.e. the distance between adjacent cords.

In accordance with the invention, the total thickness t of the fabric incorporating the cords is preferably between 0.6 mm and 0.8 mm, while the distance y between adjacent cords is preferably between 0.05 and 0.50 mm.

Table 1 summarizes the data which define the fabric of the carcass ply in accordance with two examples of embodiment, of different density, indicated respectively by 1 and 2.

TABLE 1

| Fabric | | Example 1 | Example 2 |
|---|---|---|---|
| Cord count | [dtex] | 550/2 | 550/2 |
| Total count (2 strands of twisted threads) | [dtex] | 1100 | 1100 |
| Twists per strand | [turns/dm] | 48 | 48 |
| Cord density | [cords/dm] | 200 | 180 |
| Fabric thickness "t" | [mm] | 0.67 | 0.67 |
| Cord diameter "d" | [mm] | 0.35 | 0.35 |
| Lining thickness "x" | [mm] | 0.16 | 0.16 |
| Distance "y" between adjacent cords | [mm] | 0.15 | 0.20 |
| Modulus of elasticity of fabric | [MPa/cm] | 170,000 | 153,000 |
| Fabric breaking load | [N/cm] | 1600 | 1440 |

Table 2 below, instead, compares the dimensions and the characteristics relating to a carcass fabric made in accordance with the state of the art, namely rayon cords, having a count of 1220/2 dtex, with those of the two fabrics according to the invention described in the above Examples 1 and 2.

The table also shows the percentage variations ($\Delta\%$) in the value of the parameters of the fabrics according to the invention compared to those of the known fabric. In all these fabrics the thickness "x" is equal to 0.16 mm.

TABLE 2

| Rubberized fabric | | Known | Ex. 1 | Ex. 2 |
|---|---|---|---|---|
| Cord material | | rayon | PEN | PEN |
| Count | [dtex] | 1220/2 | 550/2 | 550/2 |
| Density | [cords/dm] | 80 | 200 | 180 |
| Thickness "t" | [mm] | 0.9 | 0.67 | 0.67 |
| | $\Delta\%$ | | −25% | −25% |
| Cord diameter "d" | [mm] | 0.55 | 0.35 | 0.35 |
| | $\Delta\%$ | | −36.3% | −36.3% |
| Distance "y" | [mm] | 0.7 | 0.16 | 0.16 |
| | $\Delta\%$ | | −73% | −73% |
| Modulus of elasticity of the fabric | [Mpa/cm] | 112,000 | 170,000 | 153,000 |
| | $\Delta\%$ | | +52% | +36% |
| Breaking load of fabric | [N/cm] | 792 | 1600 | 1440 |
| | $\Delta\%$ | | +102% | +82% |

Figure 3:
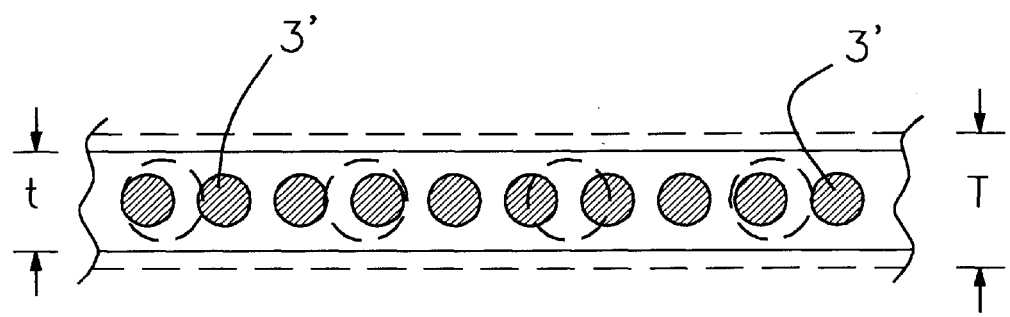
FIG. 3 shows, on the same scale, in solid lines, the carcass ply according to FIG. 2 and, superimposed in broken lines, a known carcass ply made of rayon.

FIG. 3 compares, in a cross-section through the fabric, on the same scale, the thickness t of the fabric according to Example 1 of the invention with that T of the known fabric. A preferred embodiment of the invention relates to a prototype tire for motorcycles, provided with a radial carcass, namely of the type comprising the elements for reinforcing the carcass ply which are oriented at angles of inclination with respect to the equatorial plane having a value of not less than 70°, but usually arranged along meridian planes of the tire (or in any case forming with said surface an angle very close to 90°).

This tire comprises a twin-ply carcass, i.e. formed by a pair of plies of rubberized fabric; and this pair of plies, in the prototype described herein, is obtained from the same rubberized fabric, as illustrated in FIG. 5, in particular the fabric according to Example 1.

The cords are arranged parallel with one another in each ply and intersecting with those of the adjacent ply at an angle of inclination of 76°, measured on the peripheral crown, relative to and at the equatorial plane (X—X) of the tire.

In order to evaluate the qualitative results achieved with the prototype tire according to the invention, a pair of these tires was tested on track, a comparison being made with an equivalent pair of tires, i.e. sold for the same type of vehicle and operation, produced by the Applicants themselves and representing the best option present on the market.

The tire used in the comparison had a twin-ply carcass made of nylon, with a count of 1220/2 dtex, density of 80 cords/dm, made with the fabric described in Table 2, with the cords oriented at the same angle of 76° as the tire according to the invention.

The belts, which were the same in both the tires tested, corresponded to those described above, comprising an external layer of steel cords, 3×4×0.20 HE HT, oriented circumferentially, and a radially internal layer consisting of a sheet of elastomer of 0.3 mm thickness reinforced with the so-called aramide paste: in the front tire the aforementioned cords were distributed with a density varying from 4 to 8 cords/cm, progressively from the equatorial plane to the ends of the belt.

The rear tire of the motorcycle was identical to the front tire, except for the fact that the circumferential cords were distributed with a constant density equal to 65 cords/dm.

The characteristics of the vehicle used were as follows:

| MOTORCYCLE | DUCATI 748 SS 98 |
|---|---|
| Front tire: | |
| Size | 120/70 ZR 17 |
| Inflating pressure | 2.5 bar |
| Rim | 3.50–17 |
| Rear tire: | |
| Size | 180/55 ZR 17 |
| Inflating pressure | 1.9 bar |
| Rim | 5.5–17 |

The track test consisted in evaluating the lap times of the motorcycle indicated, ridden on successive occasions by the same rider, the motorcycle having been fitted first with the pair of standard production tires and then the pair of tires according to the invention.

The track, which was of the so-called slalom type, consisted of a succession of alternating bends and straight sections along a predetermined trajectory.

The result of the test revealed a considerable reduction in the track lap time for the tires according to the invention.

In fact it emerged that the motorcycle fitted with the pair of tires according to the invention reduces the travel time by 1.3 seconds per lap compared to when the same motorcycle is fitted with the pair of comparison tires; more specifically, it emerged that the motorcycle fitted with the tires according to the invention performs a lap of the track in a time of 1′40″20 (one minute, 40 seconds and 20 hundredths of a second) compared to the time of 1′41″50 obtained with the comparison tires.

The following Table 3 shows the results of a comparison, relating to other performance data, between the tire according to the invention indicated by A and the known tire indicated by B.

The ratings indicated in Table 3 are subjective, being based on an evaluation by the rider. The ratings are expressed as a number on a scale from 1 to 10, the highest rating being attributed to the tire which demonstrated the best performance in relation to each characteristic considered.

It can also be noted how the tire according to the invention has a level of performance substantially equal to or even better than that of the comparison tire, but with a substantial improvement as regards the riding performance, i.e. the sought-after better handling of the vehicle.

TABLE 3

| TESTS/TIRES | A | B |
| --- | --- | --- |
| RIDING PERFORMANCE | 10 | 7 |
| SHOCK-ABSORBING CAPACITY | 10 | 10 |
| DIRECTIONAL STABILITY | 10 | 10 |
| BRAKING PERFORMANCE | 10 | 9 |
| COMFORT | 10 | 10 |
| CONTACT FEELING | 10 | 8 |

The last heading "Contact feeling" refers to the sensation of reliability of response of the vehicle to steering manoeuvres performed by the rider, as a result of adherence of the tire.

In order to obtain a confirmation as to the above results, a further test, complementing the road test, i.e. a so-called in-door test conducted in a laboratory, was performed, during which a wheel fitted with a front tire was placed in contact against a rotating drum, a so-called road drum, with a diameter considerably greater than that of the tire and lined with a layer possessing given abrasive characteristics able to represent overall the road surface.

The two tires compared were identical to those used for the track test.

The drum is made to rotate about its axis and the rolling plane of the tire is progressively inclined, at a predetermined slip angle "θ", with a camber angle equal to zero, i.e. keeping the abovementioned rolling plane always perpendicular to the drum surface.

The wheel, by means of its hub, is associated with special sensing instruments intended to measure the force transmitted by the road wheel to the hub via the tire carcass.

The equipment, which is known to experts as "slip thrust sensor", is used to assess the cornering effect of the tire.

It must be pointed out that the maximum slip thrust generated by the tire following setting of a slip angle is not transmitted instantaneously to the hub of the wheel, but progressively increases from zero to its value $F_{max}$ within a time interval during which the wheel travels a certain distance.

Once the slip thrust curve has been traced in a Cartesian diagram which shows along the ordinate axis the value of this thrust and along the abscissa axis the distance travelled by the wheel, the term "relaxation length" of the tire is used to define the distance "lo" travelled by the wheel, while the slip thrust increases up to 66% of its value $F_{max}$.

The value of the relaxation length "lo" is a parameter which depends on the deformability, and in particular on the rigidity of the carcass; in practice, the more rigid the carcass is, the smaller is the relaxation length.

It has been found, however, that "lo" is substantially independent of the speed of the wheel.

FIG. 5 shows the two curves I and P traced by the test equipment for the tire according to the invention and for the comparison tire, respectively.

The abscissa and ordinate values, shown on the respective scales, are expressed respectively in meters and Newtons per degree (N/°).

The test was performed assigning to the tires a slip angle "θ" equal to 3°.

As can be seen from the graph according to FIG. 5, both the curves of the tires reach the value of the maximum slip thrust "$F_{max}$" with values increasing initially almost linearly, then along a joining arc and then in an asymptotic manner towards the line parallel to the axis of the abscissae, identifying the abovementioned maximum value.

The curve I relating to the tire according to the invention provides a very surprising indication in view of the greater flexibility of the carcass fabric which is very much thinner than that of the comparison tire owing to the smaller diameter of the reinforcing cords and the consequent smaller rubberization thickness; basically this curve indicates not only that the value of the slip thrust is greater than that of the reference tire, $F_{max2} > F_{max1}$, but also that the increase of this value from zero to a significant value, 66% of its maximum value, is produced substantially at the same time, as demonstrated by the parity of the value of the relaxation length lo, in this case equal to 0.218 m at 100 Km/hour.

In other words, the tire according to the invention reaches, at the same time as the comparison tire, an absolute slip thrust value which is substantially greater.

The value of the slip thrust $F_{max2}$ is about 8% greater than the value $F_{max1}$ with an obvious advantage over the comparison tires in slalom type travel paths.

By way of conclusion it is pointed out that the carcass according to the invention is more rigid than that of the comparison tire, thus facilitating steering of the motorcycle around bends, in particular at high speeds, and that this result is achieved without adversely affecting the comfort and the braking capacity during travel along straight sections, as testified by the opinion of the riders and commented below, such that the invention achieves the object of increasing the handling capability of the vehicle, while leaving unchanged the performance characteristics.

The invention has many unexpected advantages, as will be explained hereinbelow.

It must be stated that the tire according to the invention results in a significantly improved handling action compared to the comparison tire which in turn is already better than the known tires.

The resultant improvement has been obtained by replacing in the radial carcass the fabrics containing high-count textile cords ($\geq 940/2$ dtex) with new lower-count fabrics ($\leq 840/2$ dtex), in particular fabrics containing PEN cords with a count of 550/2 dtex. It is surprisingly noted that the tire according to the invention has improved not only the manoeuvrability, but also, among other things, the contact feeling.

It seems obvious that the improvements achieved in terms of a reduction in the lap times compared to traditional tires depend exclusively on a carcass structure which is capable of reacting with greater immediacy to the continuous variation in the bends along the road, and which therefore is provided with more rigid sides.

Moreover, the greater flexibility of the carcass due to the use of thinner fabrics increases the impression area during braking, favouring an improved braking capacity.

The improvements brought about by the tires according to the invention are moreover confirmed by the evaluation of the riders with regard to the lesser degree of fatigue required in order to perform fast changes in the trajectory when riding motorcycles fitted with these tires.

The advantages obtained with the improved manoeuvrability, in combination with an unchanged performance of the motorcycle, facilitate handling since the rapid response of the tire to the manoeuvres performed, and to the consequent forces transmitted around bends from the vehicle to the road and vice versa, reduces the need for continuous corrections with steering movements of the handlebars.

Surprisingly it was also noted that the front tire according to the invention, although having a greater rigidity indicated by the greater slip thrust compared to the comparison tire ($F_{max2} > F_{max1}$), does not result in the presence of or in an increase in the shimmy effect, namely that troublesome series of oscillations, with a high frequency (8–10 Hz) at low speeds and low frequency at high speeds, which are transmitted from the handlebars to the rider's arms during travel along straight road sections.

Moreover, the greater slip thrust exerted compared to known tires results in the further advantage of being able to fit the tires according to the invention to motorcycles of above average power since it is possible to offset adequately the effects of the higher centrifugal forces generated by the greater weight and/or by the greater speed of the vehicle.

It is emphasized moreover how the tire according to the invention provides the motorcycle manufacturer with considerable help in finding solutions which are able to ensure at the same time manoeuvrability and stability at high speeds.

In order to understand the point better, the meaning of the terms "fork" and "foretravel" in connection with a motorcycle is briefly explained here.

As illustrated schematically in FIG. 6 showing a motorcycle 10, the fork 11 corresponds to the part of the vehicle on which the front wheel is mounted.

The fork comprises a tube 11 which is freely rotatable with respect to the frame and the top end of which is associated with the handlebars 13, while the bottom end is associated with a U-shaped element connected to the hub 12 of the front wheel.

The axis of the fork is inclined at an angle z with respect to an axis perpendicular to the ground and passing through the hub of the wheel.

The foretravel is the distance "m" measured on the ground between the two points of intersection, respectively, of the axis of the fork and the abovementioned vertical axis with the ground.

The above having been stated, generally the motorcycle manufacturers are able to improve the stability of the vehicle by increasing the foretravel, i.e. the angle of inclination of the fork, but in doing so worsen the manoeuvrability of the vehicle, and so they are obliged to find a compromise solution which very often is not entirely satisfactory.

The tire according to the invention favours the constructional design of the motorcycle since the increased manoeuvrability allows the foretravel, and hence the stability of the vehicle, to be increased, while retaining the same manoeuvrability of vehicles with a smaller foretravel.

The Applicants consider that they are able to formulate hereinbelow a theory in an attempt to find a logical explanation for the favourable results obtained with the present solution, without this obviously constituting a constraint or a limitation on the invention should this theory not be confirmed for any reason.

In order to support this theory, reference will be made, below, to the illustration shown in FIG. 7, in which the twin-ply structure of the carcass according to the invention is shown on the left-hand side and that of the carcass of known tires is shown on the right-hand side. The geometrical dimensions of the rubberized fabrics of the carcass according to the invention and of that of the known tires are indicated respectively under Example 1 in Table 1 and Table 2.

As shown in FIG. 7, the total thickness of the two plies, and consequently the distance (t and T) between the axes of the cords in the two fabrics combined with each other assumes a significantly smaller value in the carcass according to the invention.

Consequently the composition forming the twin-ply carcass according to the invention, formed by the combination of two very thin fabrics, so that the two layers of reinforcing cords are very close to one another, offers a greater compactness and better structural homogeneity and therefore a more isotropic performance; this fact, in combination with the high modulus of elasticity which can be achieved with an increase in the density of the cords in the fabric, as shown in FIG. 7 and indicated in Table 1, allows at the same time the rigidity and the flexibility of the carcass to be increased.

Basically the carcass realized in accordance with the invention has managed to combine the two characteristics— usually opposing—of rigidity and flexibility, resulting in better handling without adversely affecting the road-holding power and the comfort.

A further favourable result of the invention, derived from the greater rigidity of the carcass, consists in the possibility of using for the tread rubber mixtures with a modulus of elasticity which is not excessively high, i.e. "soft" mixtures which offer greater road-holding power.

The tire according to the state of the art requires, in fact, a mixture for the tread with a fairly high modulus of elasticity in order to contribute to the overall rigidity of the tire, the sole contribution of the structural rigidity, i.e. of the camber angle, as seen, not being sufficient for the road-holding power around bends.

The present invention, instead, allows one to use advantageously, when preferred and with all the other conditions being equal, mixtures for treads with hardness factors of between 50° and 60° Shore A instead of the usual mixtures having a greater hardness, of the order of 65° Shore A or more.

By way of conclusion, in accordance with the invention, it has been found that, by increasing the density of the cords in combination with a reduction in their count, it is possible to obtain motorcycle tires with a performance which can be controlled more easily and which allow better handling of the vehicle fitted with said tires.

The person skilled in the art, once he/she has understood the invention as described above, will be able to carry out also all those choices, variations and modifications of the variables associated with the invention, necessary for solving the specific technical problem faced by him/her, in connection, for example, with the type of motorcycle which is to be fitted with said tires.

What is claimed is:

1. Tire for two-wheeled vehicles, having a transverse curvature coefficient with a value of not less than 0.15, comprising a torus-shaped carcass with a central peripheral crown and two sidewalls terminating in a pair of beads for securing said tire to a corresponding mounting rim, a tread extending coaxially around said peripheral crown and a belt structure arranged between said carcass and said tread, said carcass comprising at least one rubberized fabric ply provided with reinforcing cords, characterized in that said reinforcing cords are textile cords with a count of between 420/2 and 840/2 dtex and in that said rubberized fabric incorporating the cords has a modulus of elasticity of between 100,000 MPa/cm and 200,000 MPa/cm.

2. Tire according to claim 1, wherein said textile cords are made from a material selected from the group consisting of aramide, polyethylene terephthalate (PET), polyvinyl alcohol (PVA) and polyethylene naphthalene-2,6-dicarboxylate (PEN).

3. Tire according to claim 2, wherein the density of said textile cords in-said fabric is between 125 cords/dm and 280 cords/dm.

4. Tire according to claim 1, characterized in that said textile cords are made of polyethylene naphthalene 2,6 dicarboxylate (PEN).

5. Tire according to claim 1, wherein the density of said textile cords in said fabric is between 125 cords/dm and 280 cords/dm.

6. Tire according to claim 1, characterized in that the count of said cords is 550/2 dtex.

7. Tire according to claim 1, characterized in that said carcass comprises a pair of said rubberized fabric plies, said cords being arranged parallel with one another in each ply and intersecting with those of the adjacent ply, being oriented in directions symmetrically inclined relative to the equatorial plane (X—X) of the tire.

8. Tire according to claim 7, characterized in that the angle of inclination of said cords with respect to the equatorial plane of the tire, measured on the peripheral crown at said plane is between 70° and 90°.

9. Tire according to claim 1, characterized in that it comprises a belt formed by a radially external layer provided with a plurality of turns of cords arranged at a zero angle with respect to the equatorial plane of the tire, and by a radially internal layer comprising a pair of radially superimposed strips of rubberized fabric provided with reinforcing elements incorporated in an elastomer matrix, parallel with one another in each strip, intersecting with one another in adjacent strips and inclined with respect to the equatorial plane of the tire at angles of between 18° and 50°.

10. Tire according to claim 9, characterized in that said strips are interrupted at the equatorial plane in a zone having a width of between 10% and 30% of the axial extension of said belt.

11. Tire according to claim 1, characterized in that it comprises a belt formed by a radially external layer provided with a plurality of turns of cords arranged at a zero angle with respect to the equatorial plane of the tire and a radially internal layer formed by a sheet of elastomer material comprising binding means dispersed in the elastomer material of said sheet.

12. Tire according to claim 11, wherein said sheet of elastomer material has a thickness of between 0.075 and 0.5 mm and in that said binding means consists of aramide paste.

13. Tire according to claim 1, characterized in that said tread consists of a mixture with a hardness factor of between 50° and 60° Shore A.

14. Tire wheel for motorcycles comprising a tire having a transverse curvature coefficient with a value of not less than 0.15 and a rim which can be associated with a hub of the motorcycle, said tire comprising a torus-shaped carcass with a central peripheral crown and two sidewalls terminating in a pair of beads for securing said tire to said mounting rim, a tread extending coaxially around said peripheral crown and a belt structure arranged between said carcass and said tread, said carcass comprising a reinforcing structure formed by a pair of rubberized fabric plies provided with reinforcing cords, said tire characterized in that said carcass comprises structural means designed to confer on the tire characteristics of both rigidity and flexibility, said structural means consisting in said rubberized fabric incorporating textile reinforcing cords with a count of between 420/2 and 840/2 dtex and having a modulus of elasticity of between 100,000 MPa/cm and 200,000 Mpa/cm.

15. Motorcycle fitted with a pair of tires, respectively a front tire and a rear tire, having a transverse curvature coefficient with a value of not less than 0.15, each tire comprising a torus-shaped carcass with a central peripheral crown and two sidewalls terminating in a pair of beads for securing said tire to a corresponding mounting rim, a tread extending coaxially around said peripheral crown and a belt structure arranged between said carcass and said tread, said carcass comprising at least one rubberized fabric ply provided with reinforcing cords, said motorcycle characterized in that at least the carcass of said front tire comprises a rubberized fabric incorporating textile cords with a count of between 420/2 and 840/2 dtex and having a modulus of elasticity of between 100,000 MPa/cm and 200,000 MPa/cm.

16. Motorcycle according to claim 15, characterized in that at least the carcass of said front tire comprises a pair of said rubberized fabric plies.

17. Motorcycle according to claim 15, characterized in that it comprises said front tire provided with a belt structure comprising a layer of metal circumferential cords distributed with a progressively increasing density from the equatorial plane towards the belt ends and a rear tire provided with a belt structure comprising a layer of metal circumferential cords distributed with a constant density.

18. Method for controlling the handling performance of a motorcycle fitted with a pair of tires, respectively a front tire and a rear tire, by means of the carcass structure of the tires fitted to it, said method comprising providing at least said front tire with a carcass structure comprising at least one ply of a rubberized fabric provided with a plurality of textile reinforcing cords with a count of between 420/2 and 840/2 dtex and having a modulus of elasticity of between 100,000 MPa/cm and 200,000 MPa/cm.

* * * * *

UNITED STATES PATENT AND TRADEMARK OFFICE
CERTIFICATE OF CORRECTION

PATENT NO. : 6,244,315 B1
DATED : June 12, 2001
INVENTOR(S) : Giancarlo Armellin It is certified that error appears in the above-identified patent and that said Letters Patent is hereby corrected as shown below:

<u>Column 17, claim 3,</u>
Line 34, "in-said" should read -- in said --.

Signed and Sealed this

Twenty-sixth Day of March, 2002

*Attest:*

*Attesting Officer*

JAMES E. ROGAN
*Director of the United States Patent and Trademark Office*